United States Patent
Chakraborty et al.

(10) Patent No.: US 6,542,911 B2
(45) Date of Patent: Apr. 1, 2003

(54) METHOD AND APPARATUS FOR FREEING MEMORY FROM AN EXTENSIBLE MARKUP LANGUAGE DOCUMENT OBJECT MODEL TREE ACTIVE IN AN APPLICATION CACHE

(75) Inventors: Krishnendu Chakraborty, San Mateo, CA (US); Jayashri Visvanathan, Newark, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 193 days.

(21) Appl. No.: 09/797,630

(22) Filed: Mar. 1, 2001

(65) Prior Publication Data

US 2002/0165870 A1 Nov. 7, 2002

(51) Int. Cl.[7] ............................................ G06F 17/30
(52) U.S. Cl. ..................................................... 707/206
(58) Field of Search ............................. 707/206, 205, 707/204, 203, 100, 103 R, 513; 709/203, 231; 714/39, 143; 717/108

(56) References Cited

U.S. PATENT DOCUMENTS

| | | | | |
|---|---|---|---|---|
| 6,418,446 B1 | * | 7/2002 | Lection et al. | 707/103 R |
| 6,446,256 B1 | * | 9/2002 | Hyman et al. | 717/143 |
| 2002/0184264 A1 | * | 12/2002 | Berg et al. | 707/513 |
| 2002/0188613 A1 | * | 12/2002 | Chakraborty et al. | 707/100 |

* cited by examiner

*Primary Examiner*—Diane D. Mizrahi
(74) *Attorney, Agent, or Firm*—J. D. Harriman, II, Esq.; Coudert Brothers LLP (57) ABSTRACT

The present invention relates to a garbage collector that uses an LRU algorithm to free memory from an XML DOM tree active in an application cache. According to one or more embodiments of the present invention, a threshold for the amount of memory permitted to reside in an application cache is set. Then, a garbage collector removes entries from the cache until it falls below the threshold. In one or more embodiments, a node table is used. When nodes are added to the XML DOM tree in the application cache the node table is updated. When the threshold for the amount of memory permitted to reside in the application cache is exceeded, the garbage collector applies an LRU algorithm uses the node table to determine which nodes to remove from the application cache. In one embodiment, the LRU algorithm scans the node table to determine the least recently used node in the table by examining time stamp entries in the table. Then, the algorithm removes that node and repeats the process until the XML DOM tree uses less memory in the cache than the threshold.

18 Claims, 11 Drawing Sheets

| nodeID | sessionID | user name | time stamp | node path |
|---|---|---|---|---|
| 1 | 1 | John | 08:10:00 | /John/Writer/Font |
| 2 | 2 | Bill | 07:33:11 | /Bill/Writer/Mail |
| 3 | 3 | Jack | 10:22:14 | /Jack/Writer |

| nodeID | sessionID | user name | time stamp | node path |
|--------|-----------|-----------|------------|------------------|
| 1 | 1 | John | 123445 | /John/Writer/Font |
| 2 | 2 | John | 123423 | /John/Writer/Font |
| 3 | 3 | John | 123123 | /John/Writer/Font |
| 4 | 1 | John | 123124 | /John/Mail |
| 5 | 1 | Sam | 123002 | /Sam/Writer |
| 6 | 1 | Sam | 123121 | /Sam/Writer/Font |

FIGURE 7

| nodeID | sessionID | user name | time stamp | node path |
|---|---|---|---|---|
| 1 | 1 | John | 123445 | /John/Writer/Font |
| 2 | 2 | John | 123423 | /John/Writer/Font |
| 3 | 3 | John | 123122 | /John/Writer/Font |
| 4 | 1 | Sam | 123124 | /Sam/Writer |
| 5 | 2 | Sam | 123101 | /Sam/Writer |
| 6 | 3 | Sam | 123123 | /Sam/Writer |

METHOD AND APPARATUS FOR FREEING MEMORY FROM AN EXTENSIBLE MARKUP LANGUAGE DOCUMENT OBJECT MODEL TREE ACTIVE IN AN APPLICATION CACHE

BACKGROUND OF THE INVENTION

1. Field of the Invention

The present invention relates to freeing memory from a cache, and in particular to a garbage collector that uses a least recently used (LRU) algorithm to free memory from an extensible markup language (XML) document object model (DOM) tree active in an application cache.

Portions of the disclosure of this patent document contain material that is subject to copyright protection. The copyright owner has no objection to the facsimile reproduction by anyone of the patent document or the patent disclosure as it appears in the Patent and Trademark Office file or records, but otherwise reserves all copyright rights whatsoever.

2. Background Art

The Internet is driving an unprecedented demand for access to information. The most common way that the information is presented to a user is through a graphical user interface called a web browser. When presented with data in the proper format, the web browser displays formatted text, pictures, sounds, videos, colors, and other data. To instruct a web browser to present the data in the desired manner, hypertext markup language (HTML) was originally used. HTML is a language whereby a file is created that has the necessary data and also information relating to the format of the data. XML, however, has recently emerged as the next generation of markup languages. XML is a language similar to HTML, except that it also includes information (called metadata) relating to the type of data as well as the formatting for the data and the data itself. XML uses a DOM to hold data in memory, in what is termed a DOM tree. DOM trees use a large amount of memory and in the past, the inability to free unnecessary, unneeded, or non-critical DOM trees from memory has inhibited the widespread use of XML. Before further discussing the drawbacks associated with DOM trees, an overview of the Internet is provided below.

Internet

The Internet is a network connecting many computer networks and is based on a common addressing system and communications protocol called TCP/IP (Transmission Control Protocol/Internet Protocol). From its creation it grew rapidly beyond its largely academic origin into an increasingly commercial and popular medium. By the mid-1990s the Internet connected millions of computers throughout the world. Many commercial computer network and data services also provided at least indirect connection to the Internet.

The original uses of the Internet were electronic mail (e-mail), file transfers (ftp or file transfer protocol), bulletin boards and newsgroups, and remote computer access (telnet). The World Wide Web (web), which enables simple and intuitive navigation of Internet sites through a graphical interface, expanded dramatically during the 1990s to become the most important component of the Internet. The web gives users access to a vast array of documents that are connected to each other by means of links, which are electronic connections that link related pieces of information in order to allow a user easy access to them. Hypertext allows the user to select a word from text and thereby access other documents that contain additional information pertaining to that word; hypermedia documents feature links to images, sounds, animations, and movies.

The web operates within the Internet's basic client-server format; Servers are computer programs that store and transmit documents (i.e., web pages) to other computers on the network when asked to, while clients are programs that request documents from a server as the user asks for them. Browser software allows users to view the retrieved documents. A web page with its corresponding text and hyperlinks is normally written in HTML or XML and is assigned an online address called a Uniform Resource Locator (URL).

XML DOM

XML is emerging as the next generation of markup languages. XML DOM details the characteristic properties of each element of a web page, thereby detailing how one might manipulate these components and, in turn, manipulate the page. Each component is stored in memory. Components include for instance, objects, properties, methods, and events. An object is a container which reflects a particular element of a page. Objects contain the various characteristics which apply to that element (known as properties and methods). For example, the submit object contains properties and methods relevant to the submit button in a form Properties are characteristics of an object; for example, the document object possesses a bgColor property which reflects the background color of the page. Using a programming language (e.g., JavaScript) one may, via this property, read or modify the color of the current page. Some objects contain very many properties, some contain very few. Some properties are read-only while others can be modified, possibly resulting in immediate on-screen results.

A method typically executes an action which somehow acts upon the object by which it is owned. Sometimes the method also returns a result value. Methods are triggered by the programming language being used, such as Javascript. For example, the window object possesses a method named alert( ). When supplied with string data, the alert( ) method causes a window to pop up on the screen containing the data as its message; (e.g., alert("Invalid entitled.!")).

An event is used to trap actions related to its owning object. Typically, these actions are caused by the user. For example, when the user clicks on a submit button, this is a click event which occurs at the submit object. By virtue of submitting a form, a submit event is also generated, following the click event. Although these events occur transparently, one can choose to intercept them and trigger specified program code to execute.

Application Cache

Since each component in the DOM is stored in memory, the DOM quickly becomes memory intensive. In particular, the DOM typically forms a DOM tree which is stored in an area of memory called an application cache. The cache saves copies of web pages, images, and files (i.e., objects). Then, if there is another request for the same object, it will use the copy that it has, instead of asking the server for it again. There are two main reasons that caches are used:

To reduce latency—Because the request is satisfied from the cache (which is closer to the client) instead of the server, it takes less time for the client to get the object and display it. This makes web sites seem more responsive.

To reduce traffic—Because each object is only retrieved from the server once, it reduces the amount of bandwidth used by a client. This saves money if the client is paying by traffic, and keeps their bandwidth requirements lower and more manageable.

However, the cache is limited in size. Due to the large amount of data used by the DOM when it creates its trees, the application cache quickly fills up. Currently, there is no way to free the cache of unnecessary, unneeded, or non-critical DOM trees. Hogging memory in the application cache has inhibited real time applications from widespread use of the XML DOM.

SUMMARY OF THE INVENTION

The present invention relates to an algorithm to free memory from an XML DOM tree active in an application cache. According to one or more embodiments of the present invention, a threshold for the amount of memory permitted to reside in an application cache is set. Then, an XML garbage collector removes entries from the cache until it falls below the threshold.

In one or more embodiments, a node table is used. One embodiment of the node table has entries for a nodeID, a sessionID, a user name, a time stamp, and a node path. When nodes are added to the XML DOM tree in the application cache the node table is updated. When the threshold for the amount of memory permitted to reside in the application cache is exceeded, an LRU algorithm applied by the garbage collector uses the node table to determine which nodes to remove from the application cache.

In one embodiment, the algorithm scans the node table to determine the least recently used node in the table by examining the time stamp entries in the table. Then, the algorithm removes that node and repeats the process until the XML DOM tree is smaller than the threshold. If the least recently used node has a child node opened by the same user, as indicated by the node path entry in the node table, it is not closed. Instead, the node that could not be closed has its time stamp modified to the value of the time stamp for its most recently used child plus one millisecond.

If the same user has opened the same XML node in multiple sessions, multiple entries for the same nodeID will exist for the same user in the node table. In this situation, the most recently used time stamp for the repeated nodes becomes the time stamp for all of those nodes. To decide whether to remove this type of node, one embodiment of the XML garbage collector creates an intermediate data structure. The data structure holds one entry for each repeated node. The least recently used of all entries in the intermediate data structure is chosen and then, all of those repeated entries in the node table are removed.

BRIEF DESCRIPTION OF THE DRAWINGS

These and other features, aspects and advantages of the present invention will become better understood with regard to the following description, appended claims and accompanying drawings where:

DETAILED DESCRIPTION OF THE INVENTION

The present invention relates to a garbage collector that applies an algorithm to free memory from an XML DOM tree active in an application cache. In the following description, numerous specific details are set forth to provide a more thorough description of embodiments of the invention. It will be apparent, however, to one skilled in the art, that the invention maybe practiced without these specific details. In other instances, well known features have not been described in detail so as not to obscure the invention.

XML Garbage Collector

Figure 1:
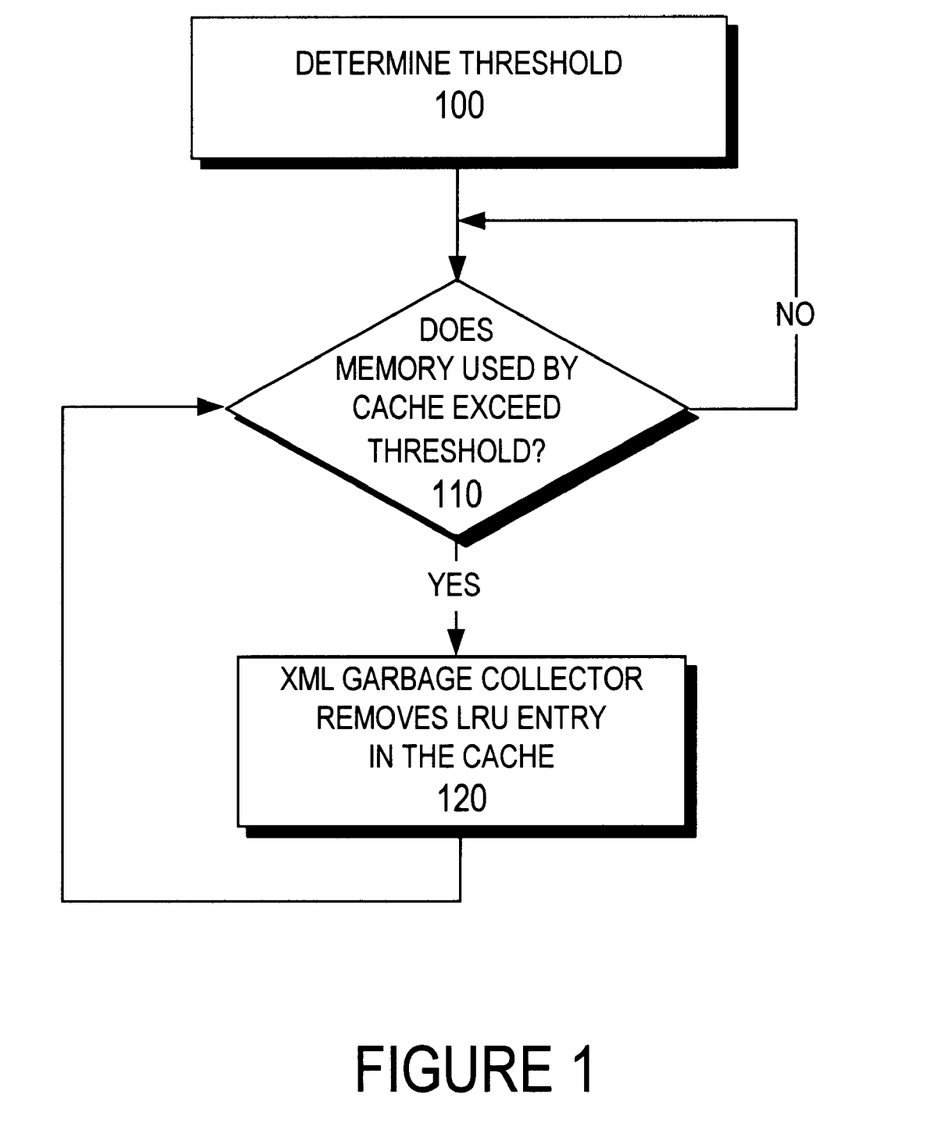
FIG. 1 is a flowchart showing the operation of an XML garbage collector according to an embodiment of the present invention.

One embodiment of the present invention is shown in FIG. 1. In this embodiment, a threshold for the amount of memory permitted to reside in an application cache is set at step 100. Then, it is determined at step 110 whether the amount of memory used by the application cache exceeds the threshold. If it does not, then the process repeats at step 110. When the used memory in the cache exceeds the threshold, an XML garbage collector removes the least recently used entry from the cache at step 120. Then, the process repeats at step 110.

Node Table

In one embodiment, a node table is used. When nodes are added to the XML DOM tree in the application cache the node table is updated. Addition of nodes happens in an independent thread. When the threshold for the amount of memory permitted to reside in the application cache is exceeded, an LRU algorithm applied by the garbage collector uses the node table to determine which nodes to remove from the application cache. This occurs when the garbage collector is kicked off. If the garbage collector is kicked off too frequently overburdens the CPU. A garbage collector that is kicked off too seldom will not remove nodes frequently enough from the node table.

In one embodiment of the present invention, the garbage collector is instantiated in its own thread that is a light weighted process. Threads typically work by sharing resources. So, they usually sleep, followed by an interval of activity, followed by an interval of sleep. The garbage collector thread acts in this manner. The period of time that the garbage collector sleeps may be chosen by the system administrator or it may take a default value.

When the garbage collector thread wakes up, it checks to see if the memory required by the application is above a threshold. If so, it starts cleaning up entries from the node table and the DOM cache until the memory falls below the stipulated limit. Once the memory goes below the limit, it sleeps. If the thread wakes up again and finds that the memory is below the threshold still, it goes back to sleep for a specific number of milliseconds again.

Figure 2:
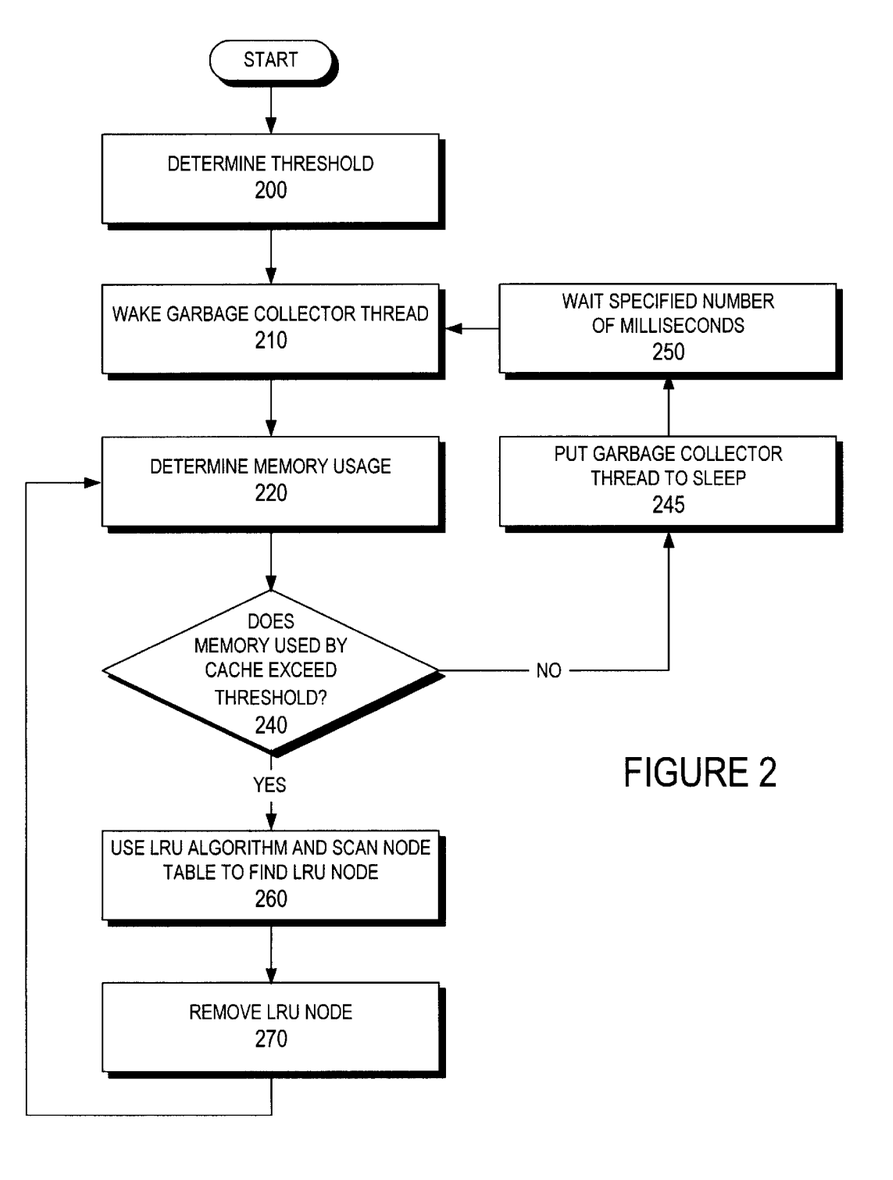
FIG. 2 is a flowchart showing the operation of a garbage collector according to another embodiment of the present invention.

This embodiment of the present invention is shown in FIG. 2. First, a threshold for the amount of memory permitted to reside in an application cache is set at step 200. Then, at step 210 the garbage collector thread is awakened. At step 220 the memory usage is determined. Next, at step 240, it is determined whether the amount of memory used by the application cache exceeds the threshold. If it does not, the garbage collector is put to sleep at step 245 and the system waits for a specified number of milliseconds at step 250 before repeating step 210.

When the used memory in the cache exceeds the threshold at step 240, the XML garbage collector uses an LRU algorithm at step 260 to scan the node table to find the LRU node. Once the LRU node is found, it is removed from the cache at step 270 and the process repeats at step 220.

Figure 3:
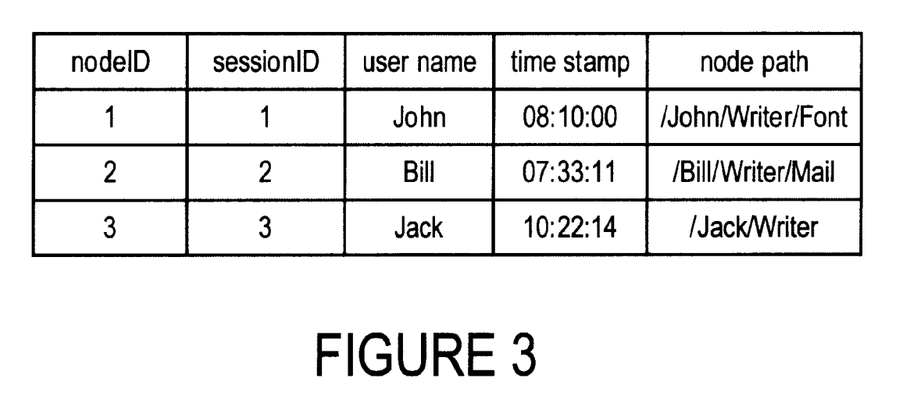
FIG. 3 is a diagram of a node table according to an embodiment of the present invention.

In one embodiment, the node table has entries for a nodeID, a sessionID, a user name, a time stamp, and a node path. An example of such a node table is shown in FIG. 3. In FIG. 3, it is seen that this embodiment of the node table has 5 columns with entries for nodeID, sessionID, user name, time stamp, and node path. The example shown in FIG. 3 is for three users, John, Bill, and Jack and includes the complete paths for their nodes and the times they were entered into the XML DOM tree, as well as nodeIDs and sessionIDs for those nodes.

Child Nodes

In one embodiment, the LRU algorithm scans a node table (the node table of FIG. 3, for instance) to determine the LRU node in the table by examining the time stamp entries in the table. Then, the algorithm removes that node and repeats the process until the XML DOM tree is smaller than the threshold. If the least recently used node has a child node opened by the same user, as indicated by the node path entry in the node table, it is not closed. Instead, the node that could not be closed has its time stamp modified to the value of the time stamp for its most recently used child plus one millisecond.

Figure 4A:
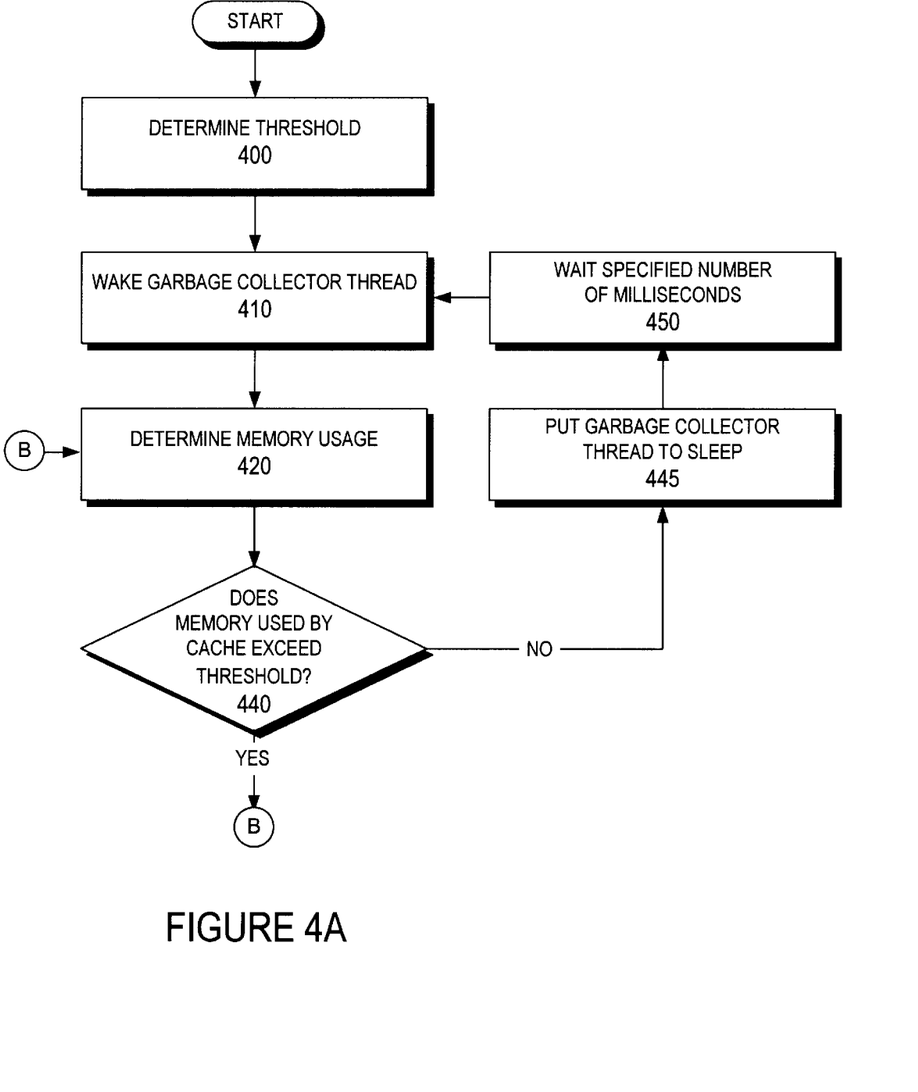
FIG. 4 is a flowchart showing the operation of a garbage collector according to another embodiment of the present invention.
Figure 4B:
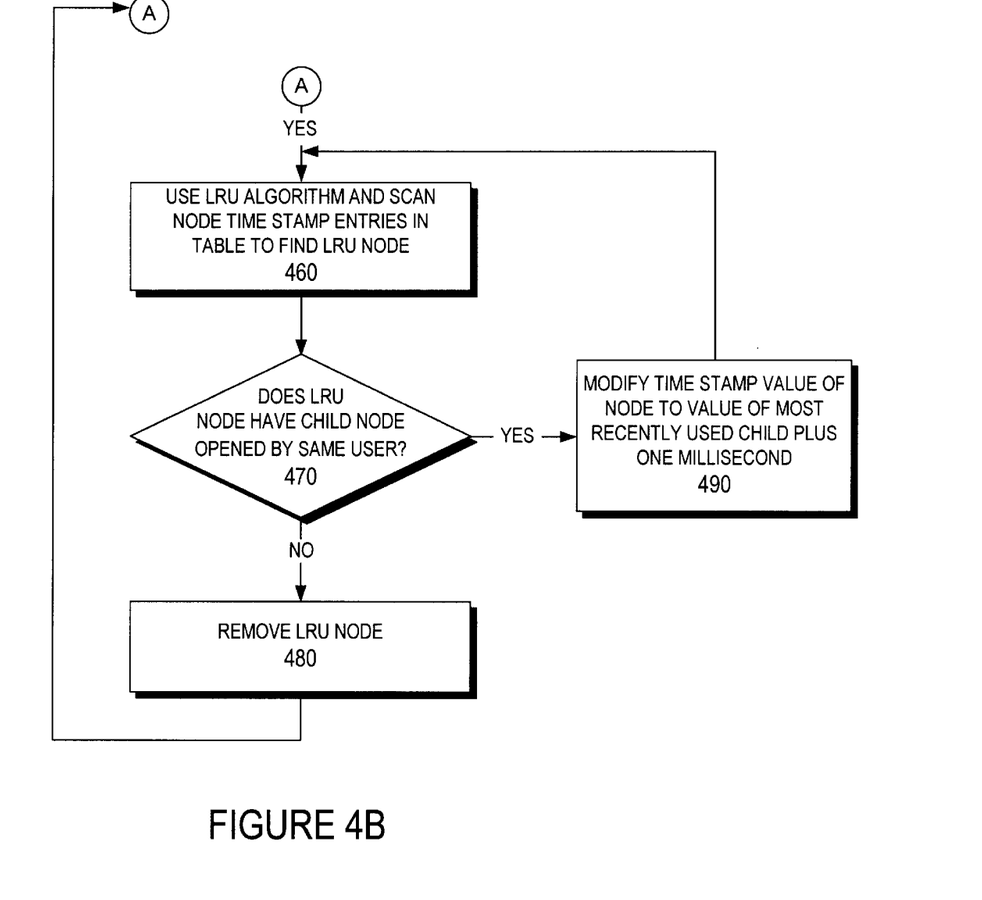

This embodiment of the present invention is shown in FIG. 4. First, a threshold for the amount of memory permitted to reside in an application cache is set at step 400. Then, at step 410 the garbage collector thread is awakened. At step 420 the memory usage is determined. Next, at step 440, it is determined whether the amount of memory used by the application cache exceeds the threshold. If it does not, the garbage collector is put to sleep at step 445 and the system waits for a specified number of milliseconds at step 450 before repeating step 420.

When the used memory in the cache exceeds the threshold at step 440, the XML garbage collector uses an LRU algorithm at step 460 to scan the timestamp entries in the node table to find the LRU node. Once the LRU node is found, it is determined if that node has a child node opened by the same user at step 470 If not, it is removed from the cache at step 480 and the process repeats at step 410.

If, however, the LRU node identified at step 460 has a child node opened by the same user, as indicated by the node path entry in the node table, it is not closed. Instead, the node that could not be closed has its time stamp modified to the value of the time stamp for its most recently used child plus one millisecond at step 490 and the process repeats at step 460.

Multiple Sessions for the Same User

If the same user has opened the same XML node in multiple sessions, multiple entries for the same nodeID will exist for the same user in the node table. In this situation, the most recently used time stamp for the repeated nodes becomes the time stamp for all of those nodes. To decide whether to remove this type of node, one embodiment of the XML garbage collector creates an intermediate data structure. The intermediate data structure holds one entry for each repeated node. The least recently used of all entries in the intermediate data structure is chosen and then, all of those repeated entries in the node table are removed by the garbage collector.

Figure 5A:
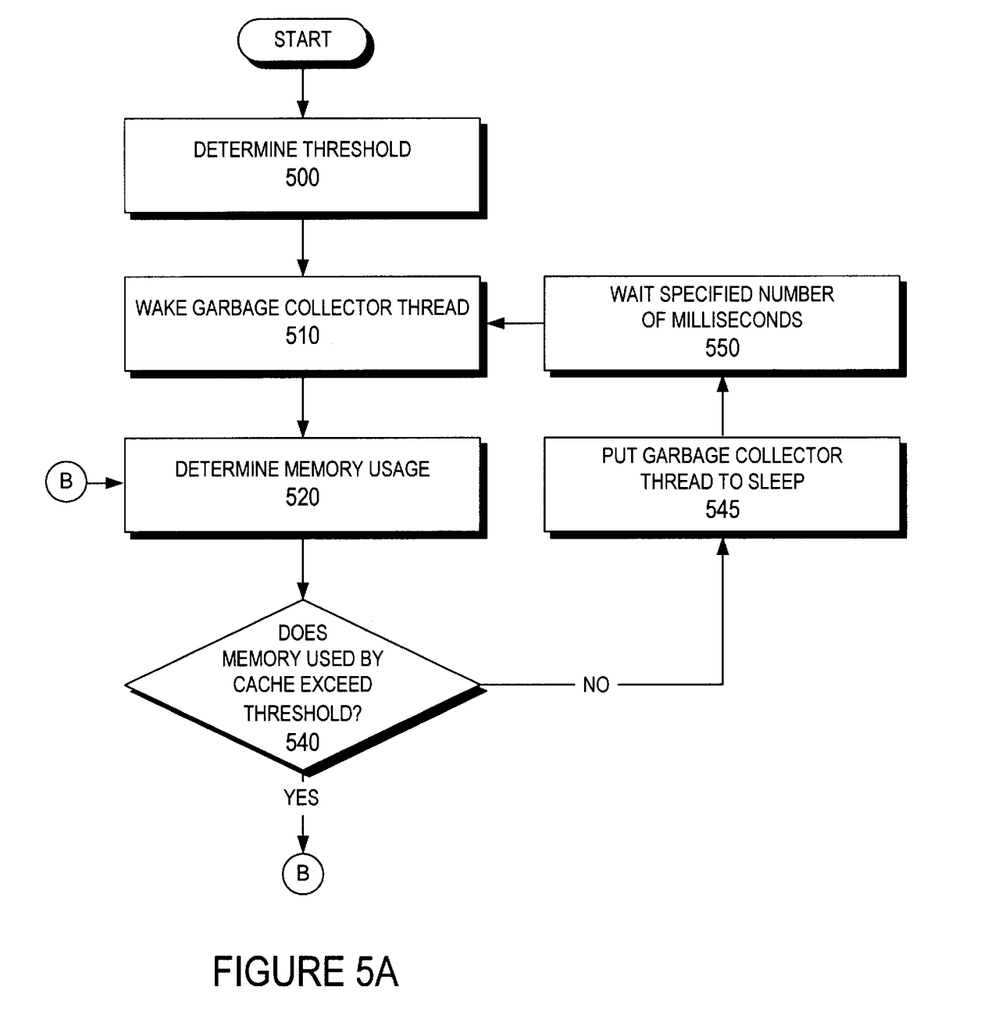
FIG. 5 is a flowchart showing the operation of a garbage collector according to another embodiment of the present invention.
Figure 5B:
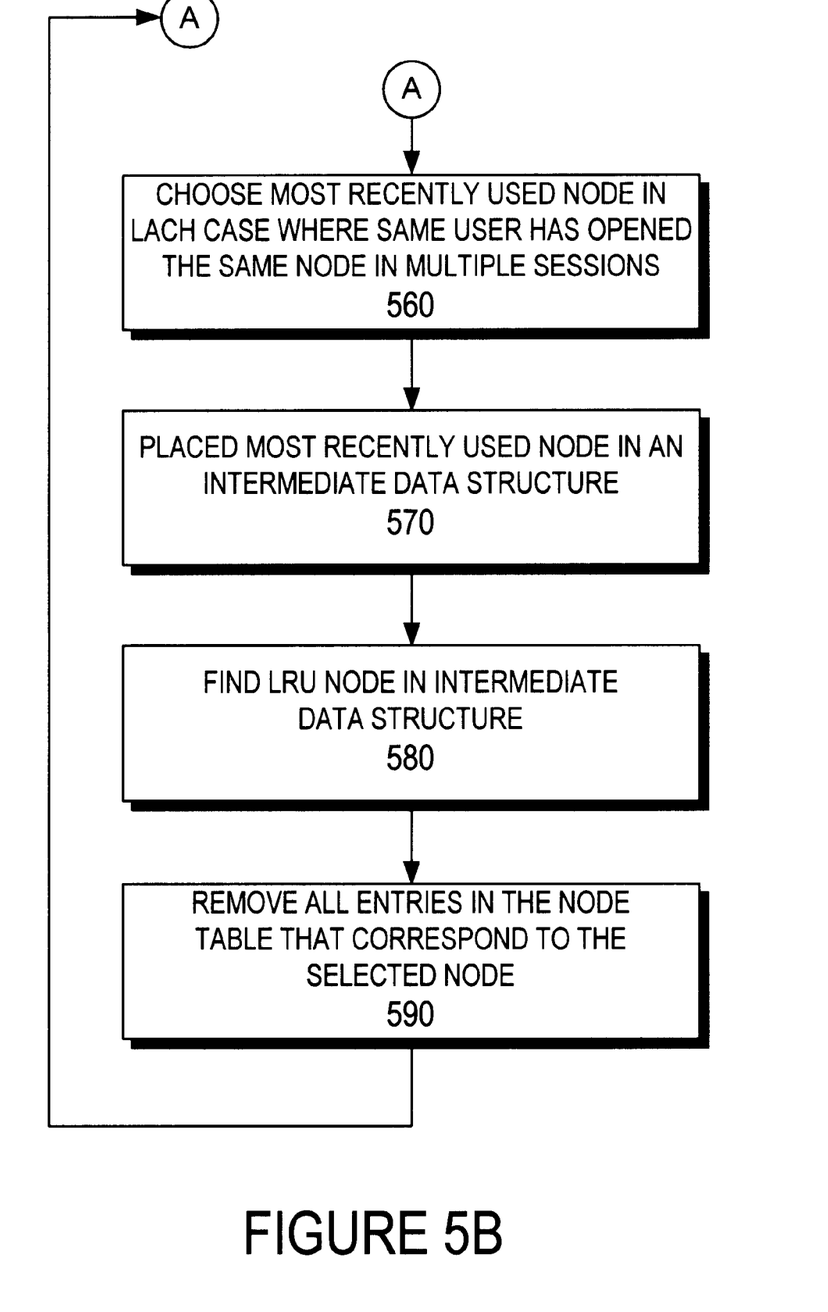

This embodiment of the present invention is shown in FIG. 5. First, a threshold for the amount of memory permitted to reside in an application cache is set at step 500. Then, at step 510 the garbage collector thread is awakened. At step 520 the memory usage is determined. Next, at step 540, it is determined whether the amount of memory used by the application cache exceeds the threshold. If it does not, the garbage collector is put to sleep at step 545 and the system waits for a specified number of milliseconds at step 550 before repeating step 510.

When the used memory in the cache exceeds the threshold at step 540, then at step 560 the most recently used node is chosen in each instance where the same user has opened the node in multiple sessions. Then, those most recently used nodes are placed in an intermediate data structure (such as an array) at step 570.

Next, the garbage collector uses an LRU algorithm at step 580 to scan the intermediate data structure to find the LRU node. Once the LRU node is found, all entries in the node table that correspond to that node are removed at step 590 and the process repeats at step 520.

Use Case Examples

Figure 6:
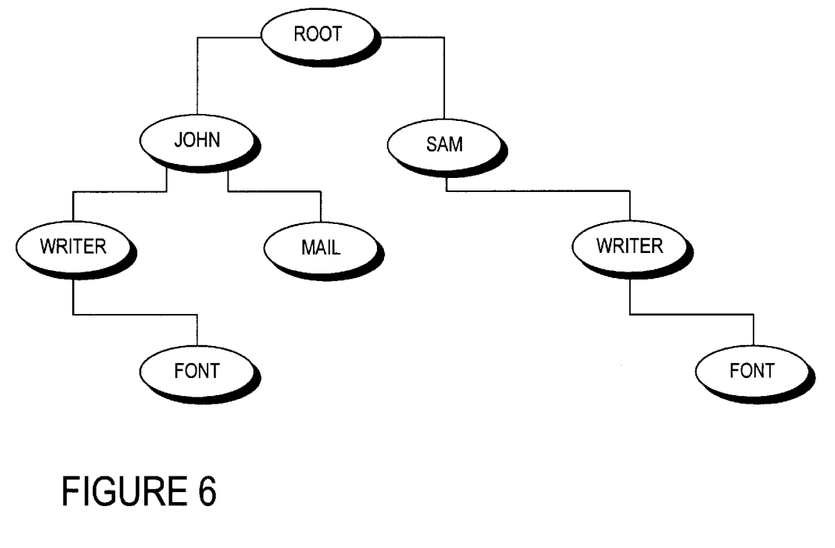
FIG. 6 is a diagram of an XML DOM tree resident in an application cache.

The following is an example of the operation of an embodiment of the present invention. Assume, for instance, that the cache had the XML DOM tree in memory that is shown in FIG. 6. Given the DOM tree of FIG. 6, then the node table at the time the XML garbage collector started running might be arranged as shown in FIG. 7.

Figure 7:
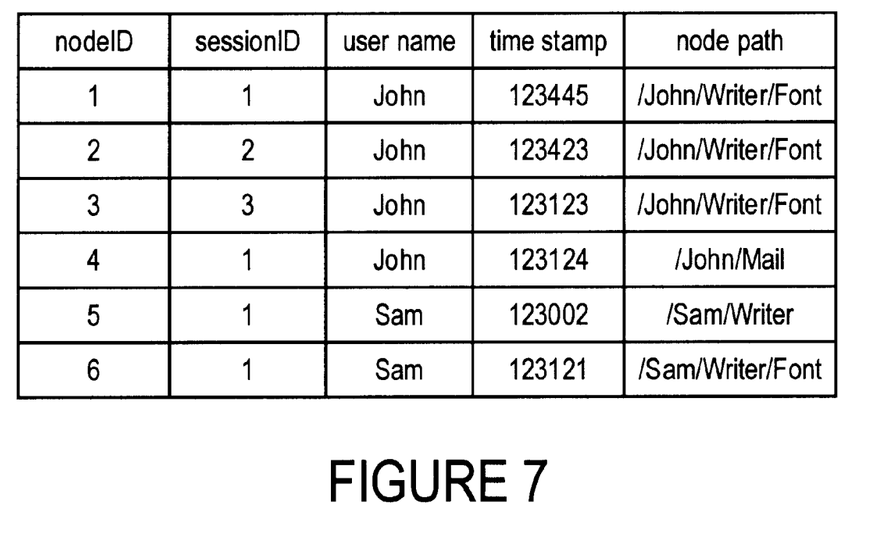
FIG. 7 is a diagram of a node table that might be used by an embodiment of the present invention.

Given such a table arrangement as is shown in FIG. 7 and assuming that the memory used by such an arrangement exceeds the threshold in each pass of the garbage collector through the node table, the following actions would occur:

Pass 1: Try to close node 5, but node 6 is a child of 5. Therefore node 5 cannot be closed, so the time stamp for 5 is changed to the timestamp of 6+1 millisecond= 123122.

Pass 2: Remove 6 since it is the LRU node.

Pass 3: Remove 5 since it is the LRU node with the new time stamp of 123122 and now has no children open.

Pass 4: Nodes 1, 2, 3, and 4 remain. 1, 2, and 3, however, belong to John and are the same node opened in different sessions. The most recently used among 1, 2, and 3 is picked (which is 1). Then, between 1 and 4, 4 is the LRU node, so it is removed.

Pass 5: Close 1, 2, and 3.

Figure 8:
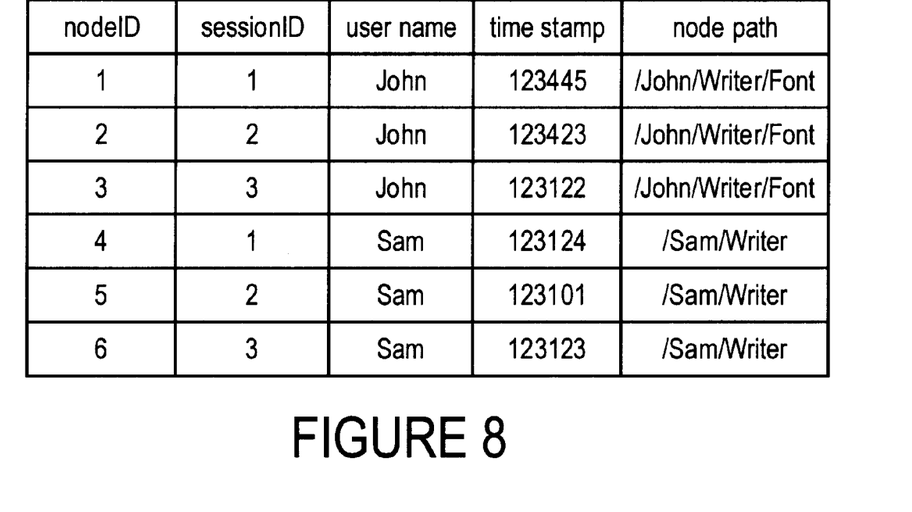
FIG. 8 is a diagram of a node table that might be used by an embodiment of the present invention.

Another example of the operation of an embodiment of the present invention is shown with respect to the node table arrangement shown in FIG. 8. Assuming that the node table is arranged as shown in FIG. 8 when the XML garbage collector begins running and assuming that on each pass of the node table, the cache memory exceeds the threshold, then the following actions would occur:

Pass 1: Nodes 1, 2, and 3 are the same node opened by John. Nodes 4, 5, and 6 are the same nodes opened by Sam of nodes 1, 2, and 3, node 1 is the most recently used. Of nodes 4, 5, and 6, node 4 is the most recently used. Thus, nodes 1 and 4 are placed in an intermediate data structure and compared. Since 4 is the LRU node in the intermediate data structure, it is chosen and nodes 4, 5, and 6 are removed from the node table.

Pass 2: Remove nodes 1, 2, and 3.

Pseudo-code that describes the operation of one embodiment of an XML garbage collector is shown in Appendix A.

Embodiment of Computer Execution Environment (Hardware)

Figure 9:
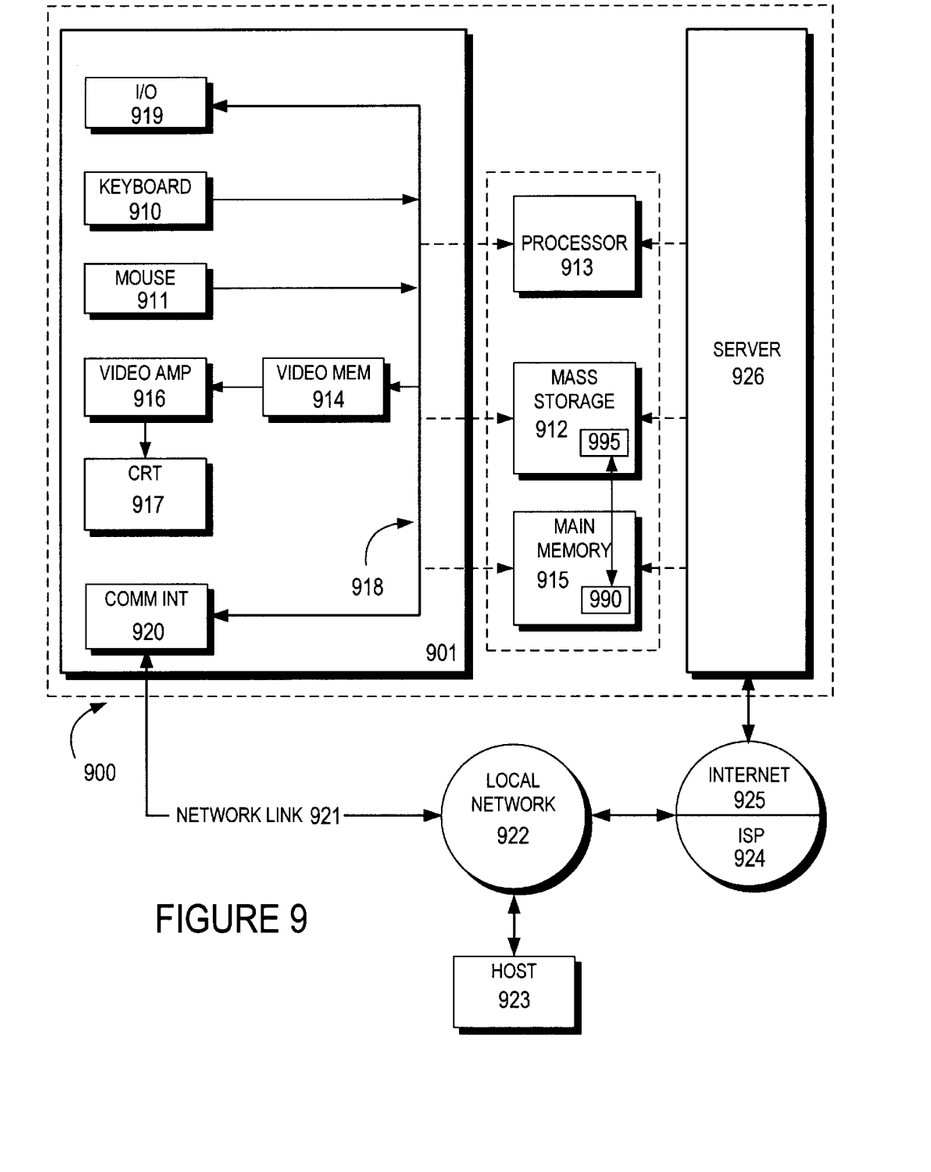
FIG. 9 is an embodiment of a computer execution environment where one or more embodiments of the present invention maybe implemented.

An embodiment of the invention can be implemented as computer software in the form of computer readable program code executed in a general purpose computing environment such as environment 900 illustrated in FIG. 9, or in the form of bytecode class files executable within a Java™ run time environment running in such an environment, or in the form of bytecodes running on a processor (or devices enabled to process bytecodes) existing in a distributed environment (e.g., one or more processors on a network). A keyboard 910 and mouse 911 are coupled to a system bus 918. The keyboard and mouse are for introducing user input to the computer system and communicating that user input to central processing unit (CPU) 913. Other suitable input devices may be used in addition to, or in place of, the mouse 911 and keyboard 910. I/O (input/output) unit 919 coupled to bi-directional system bus 918 represents such I/O elements as a printer, A/V (audio/video) I/O, etc.

Computer 901 may include a communication interface 920 coupled to bus 918. Communication interface 920 provides a two-way data communication coupling via a network link 921 to a local network 922. For example, if communication interface 920 is an integrated services digital network (ISDN) card or a modem, communication interface 920 provides a data communication connection to the corresponding type of telephone line, which comprises part of network link 921. If communication interface 920 is a local area network (LAN) card, communication interface 920 provides a data communication connection via network link 921 to a compatible LAN. Wireless links are also possible. In any such implementation, communication interface 920 sends and receives electrical, electromagnetic or optical signals which carry digital data streams representing various types of information.

Network link 921 typically provides data communication through one or more networks to other data devices. For example, network link 921 may provide a connection through local network 922 to host computer 923 or to data equipment operated by ISP 924. ISP 924 in turn provides data communication services through the world wide packet data communication network now commonly referred to as the "Internet" 925. Local network 922 and Internet 925 both use electrical, electromagnetic or optical signals which carry digital data streams. The signals through the various networks and the signals on network link 921 and through communication interface 920, which carry the digital data to and from computer 900, are exemplary forms of carrier waves transporting the information.

Processor 913 may reside wholly on client computer 901 or wholly on server 926 or processor 913 may have its computational power distributed between computer 901 and server 926. Server 926 symbolically is represented in FIG. 9 as one unit, but server 926 can also be distributed between multiple "tiers". In one embodiment, server 926 comprises a middle and back tier where application logic executes in the middle tier and persistent data is obtained in the back tier. In the case where processor 913 resides wholly on server 926, the results of the computations performed by processor 913 are transmitted to computer 901 via Internet 925, Internet Service Provider (ISP) 924, local network 922 and communication interface 920. In this way, computer 901 is able to display the results of the computation to a user in the form of output.

Computer 901 includes a video memory 914, main memory 915 and mass storage 912, all coupled to bi-directional system bus 918 along with keyboard 910, mouse 911 and processor 913. As with processor 913, in various computing environments, main memory 915 and mass storage 912, can reside wholly on server 926 or computer 901, or they may be distributed between the two. Examples of systems where processor 913, main memory 915, and mass storage 912 are distributed between computer 901 and server 926 include the thin-client computing architecture developed by Sun Microsystems, Inc., the palm pilot computing device and other personal digital assistants, Internet ready cellular phones and other Internet computing devices, and in platform independent computing environments, such as those which utilize the Java technologies also developed by Sun Microsystems, Inc. XML DOM trees and identifiers for the nodes in the DOM trees maybe stored in main memory 915 with a cache 990. Objects removed from the cache may be stored in an area 995 of mass storage 912.

The mass storage 912 may include both fixed and removable media, such as magnetic, optical or magnetic optical storage systems or any other available mass storage technology. Bus 918 may contain, for example, thirty-two address lines for addressing video memory 914 or main memory 915. The system bus 918 also includes, for example, a 32-bit data bus for transferring data between and among the components, such as processor 913, main memory 915, video memory 914 and mass storage 912. Alternatively, multiplex data/address lines maybe used instead of separate data and address lines.

In one embodiment of the invention, the processor 913 is a microprocessor manufactured by Motorola, such as the 680X0 processor or a microprocessor manufactured by Intel, such as the 80X86, or Pentium processor, or a SPARC microprocessor from Sun Microsystems, Inc. However, any other suitable microprocessor or microcomputer maybe utilized. Main memory 915 is comprised of dynamic random access memory (DRAM). Video memory 914 is a dual-ported video random access memory. One port of the video memory 914 is coupled to video amplifier 916. The video amplifier 916 is used to drive the cathode ray tube (CRT) raster monitor 917. Video amplifier 916 is well known in the art and maybe implemented by any suitable apparatus. This circuitry converts pixel data stored in video memory 914 to a raster signal suitable for use by monitor 917 Monitor 917 is a type of monitor suitable for displaying graphic images.

Computer 901 can send messages and receive data, including program code, through the network(s), network link 921, and communication interface 920. In the Internet example, remote server computer 926 might transmit a requested code for an application program through Internet 925, ISP 924, local network 922 and communication interface 920. The received code may be executed by processor 913 as it is received, and/or stored in mass storage 912, or other non-volatile storage for later execution. In this manner, computer 900 may obtain application code in the form of a carrier wave. Alternatively, remote server computer 926 may execute applications using processor 913, and utilize mass storage 912, and/or video memory 915. The results of the execution at server 926 are then transmitted through Internet 925, ISP 924, local network 922 and communication interface 920. In this example, computer 901 performs only input and output functions.

Application code may be embodied in any form of computer program product. A computer program product comprises a medium configured to store or transport computer readable code, or in which computer readable code may be embedded. Some examples of computer program products are CD-ROM disks, ROM cards, floppy disks, magnetic tapes, computer hard drives, servers on a network, and carrier waves.

The computer systems described above are for purposes of example only. An embodiment of the invention may be implemented in any type of computer system or programming or processing environment.

Thus, a garbage collector that uses an LRU algorithm to free memory from an XML DOM tree active in an application cache is described in conjunction with one or more specific embodiments. The invention is defined by the claims and their full scope of equivalents.

APPENDIX A

Pseudo-code for an embodiment of an XML garbage collector

```
Function FreeMemory
Begin function
    while (memory <specified limit specified by administrator)
    {
    for every pass in the node table
    {
        //nodeId uniquely represents a node in memory
        int nodeId = search node table for least recently
        used node and return nodeId
        If (nodeId is not getting used by other users)
        {
        Childrenfound = search for all other entries to find
        if any other children of the same node was opened
        if (childrenfound = false)
        {
            remove node from cache and entry from node table
            call FreeMemory recursively
        }
        else
        {
            //Lower the priority of the node wrt its children
            so that it is visited only after children are closed
            change the timestamp of this node to the most recently
            used time stamp of children + 1 millsecs
            call FreeMemory recursively
        }
    }
    else if (same nodeId has multiple entries in Node table)
    {
        long timedur = find out the most recently
        used entry for the node for that specific user
        create a temporary data structure
        fill it with a list of all contendors with multiple and
        single entries from the remaining nodes
        If the most recently used entry (among all the entries in
        temp data structure) is the least recently used
        {
            childrenfound = Search for all other entries
            to find if any other children of the same node was opened
            if(childrenfound = false)
            {
                remove node from cache and all entries from node table
                call FreeMemory recursively
            }
            else
            {
                //Lower the priority of the node wrt its children
                so that it is visited only after children are closed
                change the timestamp of this node to the most recently
                used time stamp of children + 1 millsecs
                call FreeMemory recursively
            }
        }
    }//End of for loop
    }// End of while loop
End function
```

What is claimed is:

1. A method for freeing memory from an XML DOM tree in a cache, said method comprising:
   storing one or more identifiers in a node table which correspond to each of one or more nodes of said XML DOM tree;
   scanning said node table to locate a least recently used node using said identifiers; and
   removing said identifiers and said least recently used node, if said XML DOM tree occupies more memory then a threshold.

2. The method of claim 1 wherein one of said identifiers comprises a time stamp entry associated with each of said nodes.

3. The method of claim 2 wherein said scanning further comprises:
   examining said time stamp entry to find said least recently used node.

4. The method of claim 3 wherein said scanning further comprises:
   determining whether said least recently used node has a child node;
   modifying said time stamp associated with said least recently used node.

5. The method of claim 4 wherein said modifying further comprises:
   changing said time stamp to a value of a most recently used child plus a millisecond.

6. The method of claim 4 wherein said scanning further comprises:
   determining whether a node is opened in multiple sessions by an identical user;
   selecting a most recently used copy of said node;
   placing one or more second identifiers for said node in an intermediate data structure;
   choosing a least recently used node in said data structure using said second identifiers;
   removing said second identifiers from said node table.

7. A computer program product comprising:
   a computer usable medium having computer readable program code embodied therein configured to free memory from an XML DOM tree in a cache, said computer program product comprising:
   computer readable code configured to cause a computer to store one or more identifiers for each of one or more nodes in said XML DOM tree in a node table;
   computer readable code configured to cause a computer to scan said identifiers to locate a least recently used node; and
   computer readable code configured to cause a computer to remove said identifiers and said least recently used node, if said XML DOM tree occupies more memory then a threshold.

8. The computer program product of claim 7 wherein one of said identifiers comprises a time stamp entry associated with each of said nodes.

9. The computer program product of claim 8 wherein said computer readable code configured to cause a computer to scan further comprises:
   computer readable code configured to cause a computer to examine said time stamp entry to find said least recently used node.

10. The computer program product of claim 9 wherein said computer readable code configured to cause a computer to scan further comprises:
    computer readable code configured to cause a computer to determine whether said least recently used node has a child node;
    computer readable code configured to cause a computer to modify said time stamp associated with said least recently used node.

11. The computer program product of claim 10 wherein said computer readable code configured to cause a computer to modify further comprises:
   computer readable code configured to cause a computer to change said time stamp to a value of a most recently used child plus a millisecond.

12. The computer program product of claim 10 wherein said computer readable code configured to cause a computer to scan further comprises:
   computer readable code configured to cause a computer to determine whether a node is opened in multiple sessions by an identical user;
   computer readable code configured to cause a computer to select a most recently used copy of said node;
   computer readable code configured to cause a computer to place one or more second identifiers for said node in an intermediate data structure;
   computer readable code configured to cause a computer to choose a least recently used node in said data structure using said second identifiers;
   computer readable code configured to cause a computer to remove said second identifiers from said node table.

13. A garbage collector for freeing memory from an XML DOM tree in a cache, said garbage collector comprising:
   a threshold for a maximum amount of memory that may reside in said cache;
   a node table configured to store one or more identifiers which correspond to each of one or more nodes of said XML DOM tree;
   a scanner for examining said identifiers to locate a least recently used node; and
   a garbage collector for removing said identifiers and said least recently used node, if said XML DOM tree occupies more memory then said threshold.

14. The garbage collector of claim 13 wherein one of said identifiers is a time stamp entry associated with each of said nodes.

15. The garbage collector of claim 14 wherein said scanner further comprises:
   an examiner for looking at said time stamp entry to find said least recently used node.

16. The garbage collector of claim 15 wherein said step of scanning further comprises:
   a determiner for determining whether said least recently used node has a child node;
   a modifier for modifying said time stamp associated with said least recently used node.

17. The garbage collector of claim 16 wherein said modifier further comprises:
   a second time stamp configured to be changed to a value of said time stamp for a most recently used child plus a millisecond.

18. The garbage collector of claim 16 wherein said step of scanning further comprises:
   a second determiner for determining whether a node is opened in multiple sessions by an identical user;
   a selector for obtaining a most recently used copy of said node;
   an intermediate data structure to place one or more second identifiers relating to said node;
   a chooser for choosing a least recently used node in said data structure using said second identifiers; and
   a remover to remove every instance of said second identifiers in said node table.

* * * * *